US007288919B2

(12) United States Patent
Morita

(10) Patent No.: US 7,288,919 B2
(45) Date of Patent: Oct. 30, 2007

(54) VOLTAGE BALANCE CIRCUIT, VOLTAGE DETECTIVE CIRCUIT, VOLTAGE BALANCING METHOD, AND VOLTAGE DETECTING METHOD

(75) Inventor: Koichi Morita, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 221 days.

(21) Appl. No.: 10/491,362

(22) PCT Filed: Oct. 1, 2002

(86) PCT No.: PCT/JP02/10232

§ 371 (c)(1), (2), (4) Date: Mar. 31, 2004

(87) PCT Pub. No.: WO03/032464

PCT Pub. Date: Apr. 17, 2003

(65) Prior Publication Data

US 2004/0246635 A1 Dec. 9, 2004

(30) Foreign Application Priority Data

Oct. 1, 2001 (JP) ............................ 2001-305426

(51) Int. Cl.
*H02J 7/00* (2006.01)

(52) U.S. Cl. ....................... 320/116; 320/117; 320/118; 320/119; 320/120; 320/121; 320/122; 320/123

(58) Field of Classification Search ........ 320/116–123, 320/134; 307/9.1, 10.1, 10.6

See application file for complete search history.

(56) References Cited

U.S. PATENT DOCUMENTS 5,932,932 A * 8/1999 Agatsuma et al. ......... 307/10.6
6,064,178 A * 5/2000 Miller ........................ 320/117

FOREIGN PATENT DOCUMENTS

| | | | |
|---|---|---|---|
| EP | 0 828 304 A2 | | 3/1998 |
| EP | 0 990 913 A1 | | 4/2000 |
| GB | 2 337 166 A | | 11/1999 |
| GB | 2337166 A | | 11/1999 |
| JP | 10-084627 | | 3/1998 |
| JP | 10-164768 | | 6/1998 |
| JP | 10164768 | | 6/1998 |
| JP | 11-098698 | | 4/1999 |
| JP | 11-248755 | | 9/1999 |
| JP | 11-248756 | | 9/1999 |
| JP | 11-248757 | | 9/1999 |
| WO | WO-9815047 | * | 4/1998 |

* cited by examiner

*Primary Examiner*—Gary L. Laxton
*Assistant Examiner*—Samuel Berhanu
(74) *Attorney, Agent, or Firm*—Howard & Howard Attorneys, P.C.

(57) ABSTRACT

When a control section (39) turns on a switch (31, 33, 35), a capacitor (37) is connected to a secondary battery (B1) in parallel. Accordingly, voltage between both ends of each capacitor (37, 38) reaches voltage between both polarities of each secondary battery (B1, B2). Thereafter, when the control section (39) turns off the switch (31, 33, 35) and turns on a switch (32, 34, 36), each capacitor (37, 38) is connected to the secondary battery (B2, B3) in parallel. The capacitor (37, 38) is charged/discharged to balance voltage between both polarities of the secondary battery (B1 to B3).

5 Claims, 10 Drawing Sheets

CONTROL SIGNAL S1
SUPPLIED TO SWITCHES
31, 33, 35

CONTROL SIGNAL S2
SUPPLIED TO SWITCHES
32, 34, 36

VOLTAGE BALANCE CIRCUIT, VOLTAGE DETECTIVE CIRCUIT, VOLTAGE BALANCING METHOD, AND VOLTAGE DETECTING METHOD

TECHNICAL FIELD

The present invention relates to a voltage balance circuit that balances voltage between both polarities of each of multiple secondary batteries connected to one another in series or a charging voltage of each of multiple capacitors connected to one another in series, voltage detection circuit that detects a charging voltage of each secondary battery or each capacitor, voltage balance method, and voltage detection method.

BACKGROUND ART

When charging and discharging are repeated many times, the multiple secondary batteries connected to one another in series cause unbalance in charging voltages of the secondary batteries. Namely, a phenomenon occurs where charging voltages of the respective secondary batteries are not equal to each other. When the charging voltages of the respective secondary batteries become unequal extremely, there exist secondary batteries that are sufficiently charged with high voltage and secondary batteries that are short of charging because of low charging voltages. When the whole multiple series-connected secondary batteries are charged again in order to charge the insufficiently charged secondary batteries, the sufficiently charged secondary batteries are overcharged. When the secondary batteries are overcharged, the life of the barriers becomes short. Moreover, the insufficiently charged secondary batteries are discharged, the insufficiently charged secondary batteries are overdischarged. In the case of overdischarging, discharging cannot be performed any more. Accordingly, when voltage unbalance occurs, not only the entire capacity reduces but also an influence is exerted upon the life of the batteries, so that the ability cannot be satisfactorily exerted as a whole.

In order to prevent such voltage unbalance, a voltage detection circuit that monitors voltage of the secondary battery and a discharge circuit that discharges the secondary battery based on the monitoring result were provided for each secondary battery and there was need to provide a voltage balance circuit shown in FIG. 9.

However, the conventional voltage balance circuit has the following problems.

FIG. 9 is a circuit diagram of a voltage balance circuit of the conventional secondary battery.

A voltage balance circuit 10 is one that balances charging voltages of three secondary batteries B1, B2, and B3 connected to one another in series. The voltage balance circuit 10 includes three Zener diodes 11, 12, and 13. A cathode of the Zener diode 11 is connected to a positive polarity of the secondary battery B1. An anode of the Zener diode 11 is connected to a connecting node N1 between the negative polarity of the secondary battery B1 and the positive polarity of the secondary battery B2. A cathode of the Zener diode 12 is connected to the connecting node N1. An anode of the Zener diode 12 is connected to a connecting node N2 between the negative polarity of the secondary battery B2 and the positive polarity of the secondary battery B3. A cathode of the Zener diode 13 is connected to the connecting node N2. An anode of the Zener diode 13 is connected to the negative polarity of the secondary battery B3.

When the voltage of the corresponding secondary battery B1 exceeds a yield point of the Zener diode 11, current flows into the Zener diode 11 and the secondary battery B1 is discharged. When the voltage of the corresponding secondary battery B1 does not exceed the yield point of the Zener diode 11, no current flows and the secondary battery B1 is charged. The same can be applied to the respective Zener diodes 12 and 13. Namely, when the voltages of the corresponding secondary batteries B2 and B3 are higher than the yield point of the Zener diode 11, current flows into the respective Zener diodes 12 and 13 and the secondary batteries B2 and B3 discharge. When they do not exceed the yield point, no current flows into the respective Zener diodes 12 and 13 and the secondary batteries B2 and B3 are charged. Accordingly, the charging voltages of the secondary batteries B1 to B3 are balanced.

While, in the case of balancing the voltages of the respective capacitors connected to one another in series, a voltage detection circuit that monitors voltage of the capacitor and a discharge circuit that discharges based on the monitoring result are provided for each capacitor. Moreover, there was need to provide a voltage balance circuit as illustrated in next FIG. 10.

A voltage balance circuit 20 is one that balances charging voltages of three capacitors C1, C2, and C3 connected to one another in series. The voltage balance circuit 20 includes three resistors 21, 22, and 23 connected in parallel to the capacitors C1 to C3 respectively. The resistance values of the resistors 21 to 23 are equal to each other. Voltages divided by the resistors 21 to 23 are applied to connecting nodes of the capacitors C1 to C3. Accordingly, charging voltages of the capacitors C1 to C3 are balanced.

In the conventional voltage balance circuit 10 of FIG. 9, current flows into the respective Zener diodes 11 to 13 to prevent the respective secondary batteries B1 to B3 from being overcharged. However, when current flows into three Zener diodes 11 to 13 simultaneously, loss is generated by the current to reduce efficiency. Moreover, since the charging voltages of the secondary batteries B1 to B3 are decided by breakdown voltage of the respective Zener diodes 11 to 13, there was a case in which the charging voltage varied depending on the accuracy of the Zener diodes 11 to 13.

While, in the voltage balance circuit 20 of FIG. 10, since constant current flows into the resistors 21 to 23, loss is generated.

Moreover, when the voltage detection circuit, which detects the charging voltage, is provided for each of the secondary batteries B1 to B3 or each of the capacitors C1 to C3, the circuit scale is increased.

DISCLOSURE OF INVENTION

An object to the present invention is to provide a voltage balance circuit that is capable of reducing loss and voltage balance method.

Moreover, an object of the present invention is to simplify the configuration of a voltage detection circuit that detects voltages between both polarities of the respective storage circuits such as secondary batteries and capacitors that are connected to one another in series.

In order to attain the above object, a voltage balance circuit according to a first aspect of the present invention is a voltage balance circuit that balances voltage between both polarities of each storage circuit of a plurality of storage circuits (B1, B2, B3) connected to one another in series, comprising a capacitor (37, 38), a first connecting section (31, 33, 35) that connects the capacitor in parallel to a storage circuit selected from the plurality of storage circuits (B1, B2, B3) connected to one another in series to charge/discharge the capacitor (37, 38) from the selected storage circuit (B1, B2, B3), and a second connecting section (32, 34, 36) that connects the charged/discharged capacitor (37, 38) in parallel to another selected storage circuit (B1, B2, B3) different from the selected storage circuit (B1, B2, B3) to charge/discharge the another selected capacitor (B1, B2, B3) from the charged/discharged capacitor (37, 38).

By the adoption of such a structure, the capacitor is connected to the selected storage circuit in parallel to be charged by a charging voltage of the selected storage circuit. By connecting the capacitor to another selected storage circuit in parallel, energy transfer from the capacitor to the storage circuit is performed. Accordingly, charging voltages of the selected storage circuit and another selected storage circuit are balanced. In addition, the voltage balance circuit may comprise a control section (39) that repeats processing that connects the selected storage circuit (B1, B2, B3) to the capacitor (37, 38) in parallel and processing that connects the capacitor (37, 38) to the another selected storage circuit (B1, B2, B3).

Moreover, each storage circuit of the plurality of storage circuits connected to one another in series may include one or multiple secondary batteries (B1, B2, B3).

Furthermore, each storage circuit of the plurality of storage circuits connected to one another in series may include one or multiple secondary capacitors (C1, C2, C3).

Moreover, the first connecting section and the second connecting section may include a first switch (31, 33, 35) and a second switch (32, 34, 36) that are connected to each other in series between one electrode of the each storage circuit (B1, B2, B3) and the other electrode, and a connecting node between the first switch (31, 33, 35) and the second switch (32, 34, 36), that are connected to each other in series between one electrode of the each storage circuit (B1, B2, B3) and the other electrode, may be connected by the capacitor (37, 38).

Furthermore, a voltage detection circuit according to a second aspect of the present invention is a voltage detection circuit that detects a voltage between both polarities of each storage circuit of a plurality of storage circuits (B1, B2, B3) connected to one another in series, comprising a first capacitor (67, 68, 69), a second capacitor (72), a charging section (62, 64, 66, 71) that selects one storage circuit (B1, B2, B3) from the plurality of storage circuits (B1, B2, B3) to charge the first capacitor (67, 68, 69) by voltage of one electrode of the selected storage circuit (B1, B2, B3), a voltage applying section (61, 63, 65, 70) that connects the first capacitor (67, 68, 69) to the second capacitor (72) in series to apply voltage of the other electrode of the selected storage circuit (B1, B2, B3) to the first capacitor (67, 68, 69) and the second capacitor (72) connected to each other in series, and a pair of measuring terminals connected to both ends of the second capacitor (72) to detect voltage between both polarities of the selected storage circuit (B1, B2, B3).

By the adoption of such a structure, for example, a negative voltage of the selected storage circuit is charged to the first capacitor by the charging section. In the voltage applying section, a difference voltage between the positive voltage of the selected storage circuit and the negative voltage charged to the first capacitor is applied to the second capacitor. Namely, the second capacitor is charged by voltage between both polarities of the selected storage circuit.

In addition, the voltage detection circuit can comprise a control section (39) that repeats processing that charges the first capacitor (67, 68, 69) in connection with the selected storage circuit (B1 B2, B3) and processing that applies voltage of the other electrode of the selected storage circuit (B1, B2, B3) to the first capacitor (67, 68, 69) and the second capacitor (72) connected to each other in series.

Moreover, the charging section (62, 64, 66, 71) may include a plurality of first switches (62, 64, 66) each having one end connected to one electrode of the each storage circuits (B1, B2, B3) and the other end connected to one electrode of the each first capacitors (67, 68, 69), a charging switch (71) having one end connected to the other electrode of the plurality of first capacitors (67, 68, 69) in common and the other end connected to a node that sets a reference electric potential, and a control section (39) that turns on the first switch (62, 64, 66) having one end connected to the selected storage circuit (B1, B2, B3) and the charging switch (71).

Furthermore, one electrode of the second capacitor (72) may be connected to the other end of the charging switch (71), and the voltage applying section (61, 63, 65, 70) may include a plurality of second switches (61, 63, 65) each having one end connected to the other electrode of the each storage circuit (B1, B2, B3) and the other end connected to one electrode of the each first capacitor (67, 68, 69); a voltage applying switch (70) having one end connected to the other electrode of the plurality of first capacitors (67, 68, 69) and the other end connected to the other electrode of the second capacitor (72), and a control section (39) that turns off the plurality of first switches (62, 64, 66) and the charging switch (71) and turns on the second switch (61, 63, 65) having one end connected to the selected storage circuit (B1, B2, B3) and the voltage applying switch (70) when voltage of the other electrode of the selected storage circuit (B1, B2, B3) is applied to the first capacitor (67, 68, 69) and the second capacitor (72) connected to each other in series.

Furthermore, the each storage circuit may include one or multiple secondary batteries (B1, B2, B3).

Moreover, the each storage circuit may include one or multiple capacitors (C1, C2, C3).

Furthermore, a voltage detection circuit according to a third aspect of the present invention is a voltage detection circuit that detects voltage between both polarities of each storage circuit of a plurality of storage circuits (B1, B2, B3) connected to one another in series, comprising a terminal voltage detecting section (62, 64, 66) that selects one storage circuit (B1, B2, B3) from the plurality of storage circuits (B1, B2, B3) connected to one another in series to detect voltage of one electrode of the selected storage circuit, a pair of measuring terminals (both ends of 71) capable of measuring voltage, and a voltage detecting section (67 to 69, 71) that detects voltage of the other electrode of the selected storage circuit (B1, B2, B3) to show a differential voltage between the voltage of the other electrode and the voltage detected by the terminal voltage detecting section (62, 64, 66) to the pair of measuring terminals (both ends of 71) as voltage between both polarities of the selected storage circuit (B1, B2, B3).

By the adoption of such a structure, for example, a negative voltage of the selected storage circuit is detected by the terminal voltage detecting section. A positive voltage of the selected storage circuit is detected by the voltage detecting section, and a differential voltage corresponding to the voltage between both polarities of the selected storage circuit is detected from the voltage detected by the terminal voltage detecting section and provided to the pair of measuring terminals. Namely, when the electric potential difference of the pair of measuring terminals is measured, the voltage between both polarities of each storage circuit can be measured.

In addition, the terminal voltage detecting section may include a plurality of first switches (62, 64, 66) each having one end connected to one electrode of the each storage circuits (B1, B2, B3), one of the pair of measuring terminals (both ends of 71) may be connected to a node that sets a reference electric potential, and the voltage detecting section (67 to 69, 71) may include a plurality of second switches (61, 63, 65) each connected between the other end of the each first switch (62, 64, 66) and the other electrode of the each storage circuit (B1, B2, B3), a plurality of capacitors (67 to 69), corresponding to the respective storage circuits (B1, B2, B3), each having one electrode connected to a node between each the first switch (62, 64, 66) and each the second switch (61, 63, 65) and the other electrode connected to the other measuring terminal of the pair of measuring terminals (both ends of 71) in common, a third switch (71) connected between the pair of measuring terminals, and a control section (39) that turns on the fist switch (62, 64, 66) connected to the selected storage circuit (B1, B2, B3) and the third switch (71) to charge the capacitor (67, 68, 69) corresponding to the selected storage circuit (B1, B2, B3) and turns off the first switch (62, 64, 66) and the third switch (71) and thereafter turning on the second switch (61, 63, 65) connected to the selected storage circuit (B1, B2, B3) at the time of showing the differential voltage to the pair of measuring terminals (both ends of 71).

Moreover, the plurality of storage circuits (B1, B2, B3) connected to one another in series may be sequentially scanned to show the differential voltage to the pair of measuring terminals (both ends of 71) for each storage circuit (B1, B2, B3) in order to measure voltage between both polarities of the each storage circuit (B1, B2, B3) from the terminal voltage detecting section (62, 64, 66) and the voltage detecting section (67 to 69, 71).

Furthermore, the each storage circuit may include one or multiple secondary batteries (B1, B2, B3).

Moreover, the each storage circuit may include one or multiple capacitors (C1, C2, C3).

Furthermore, a voltage balance method according to a fourth aspect of the present invention is a voltage balance method of balancing voltage between both polarities of each storage circuit of a plurality of storage circuits (B1, B2, B3) connected to one another in series, comprising the steps of connecting a capacitor (37, 38) in parallel to a storage circuit selected from the plurality of storage circuits (B1, B2, B3) connected to one another in series to charge/discharge the capacitor (37, 38) from the selected storage circuit (B1, B2, B3), and connecting the charged/discharged capacitor (37, 38) in parallel to another selected storage circuit (B1, B2, B3) different from the selected storage circuit (B1, B2, B3) to charge/discharge the another selected capacitor (B1, B2, B3) from the charged/discharged capacitor (37, 38).

Moreover, a voltage detection method according to a fifth aspect of the present invention is a voltage detection method of detecting voltage between both polarities of each storage circuit of a plurality of storage circuits (B1, B2, B3) connected to one another in series, comprising the steps of selecting one storage circuit from the plurality of storage circuits (B1, B2, B3) to charge a first capacitor (67, 68, 69) by voltage of one electrode of the selected storage circuit (B1, B2, B3), connecting the first capacitor (67, 68, 69) and a second capacitor (72) to each other in series to apply voltage of the other electrode of the selected storage circuit (B1, B2, B3) to the first capacitor (67, 68, 69) and the second capacitor (72) connected to each other in series, and detecting the voltage applied to both ends of the second capacitor (72) as voltage between both polarities of the selected storage circuit (B1, B2, B3).

Furthermore, a voltage detection method according to a sixth aspect of the present invention is a voltage detection method of detecting a voltage between both polarities of the respective storage circuits of a plurality of storage circuits (B1, B2, B3) connected to one another in series, comprising the steps of selecting one storage circuit (B1, B2, B3) from the plurality of storage circuits (B1, B2, B3) connected to one another in series to detect voltage of one electrode of the selected storage circuit, detecting voltage of the other electrode of the selected storage circuit (B1, B2, B3) to show a differential voltage between the voltage of the other electrode and the detected voltage to a pair of measuring terminals (both ends of 71) as voltage between both polarities of the selected storage circuit (B1, B2, B3), and detecting voltage between both polarities of each storage circuit (B1, B2, B3) at both ends of the pair of measuring terminals.

BEST MODE FOR CARRYING OUT THE INVENTION

First Embodiment

Figure 1:
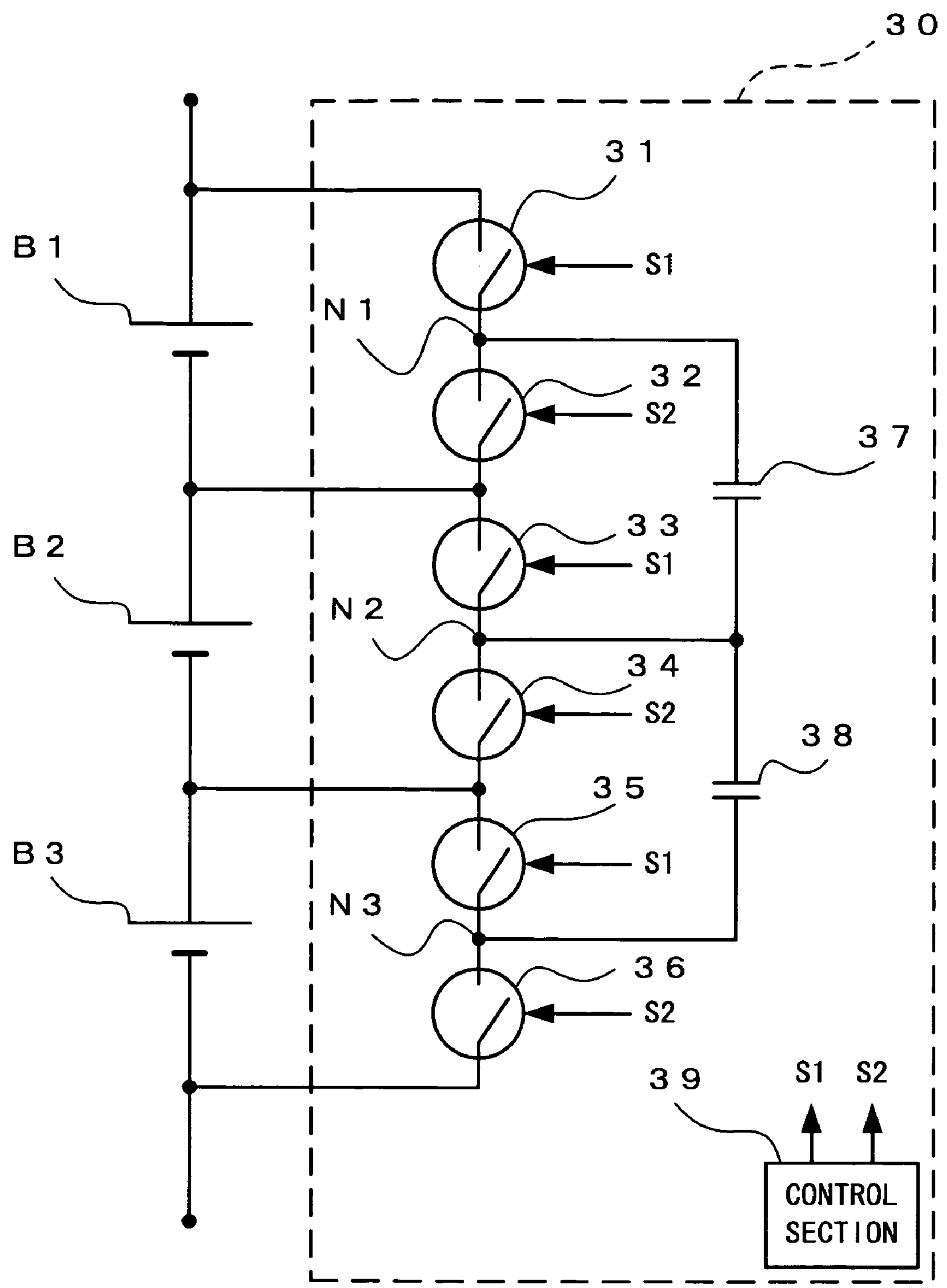
FIG. 1 is a view illustrating a structure of a voltage balance circuit according to a first embodiment of the present invention.

FIG. 1 is a view illustrating a structure of a voltage balance circuit according to a first embodiment of the present invention.

Three secondary batteries B1, B2, and B3 are storage circuits, respectively, and connected to in series to one another.

A voltage balance circuit 30 includes six switches 31, 32, 33, 34, 35, and 36, two capacitors 37, and 38, and a control section 39. The voltage balance circuit 30 is a circuit that balances voltages of three secondary batteries B1, B2 and B3.

The switches 31 to 36 are those that connect the secondary batteries B1, B2, B3 to the capacitors 37 and 38. The switches 31 to 36 are formed of bipolar transistor, FET (Field Effect Transistor), and the like.

One end of the switch 31 is connected to the positive polarity of the secondary battery B1. The other end of the switch 31 is connected to one end of the switch 32 by a connecting node N1. The other end of the switch 32 is connected to the negative polarity of the secondary battery B1. One end of the switch 33 is connected to the positive polarity of the secondary battery B2. The other end of the switch 33 is connected to one end of the switch 34 by a connecting node N2. The end of the switch 34 is connected to the negative polarity of the secondary battery B2. One end of the switch 35 is connected to the positive polarity of the secondary battery B3. The other end of the switch 35 is connected to one end of the switch 36 by a connecting node N3. The other end of the switch 36 is connected to the negative polarity of the secondary battery B3.

The capacitors 37 and 38 are those that move storage energy of the secondary batteries B1, B2 and B3. The capacitors 37 and 38 have necessary capacities for that end.

The capacitor 37 is connected between the connecting node N1 and the connecting node N2. The capacitor 38 is connected between the connecting node N2 and the connecting node N3. The switches 31 and 33 are those that connect the capacitor 37 to the secondary battery B1 in parallel when the secondary battery B1 is selected. The switches 33 and 35 are those that connect the capacitor 38 to the secondary battery B2 in parallel when the secondary battery B2 is selected.

The switches 32 and 34 are those that connect the capacitor 37 to the secondary battery B2 in parallel when the secondary battery B2 is selected. The switches 34 and 36 are those that connect the capacitor 38 to the secondary battery B3 in parallel when the secondary battery B3 is selected.

Figure 2:
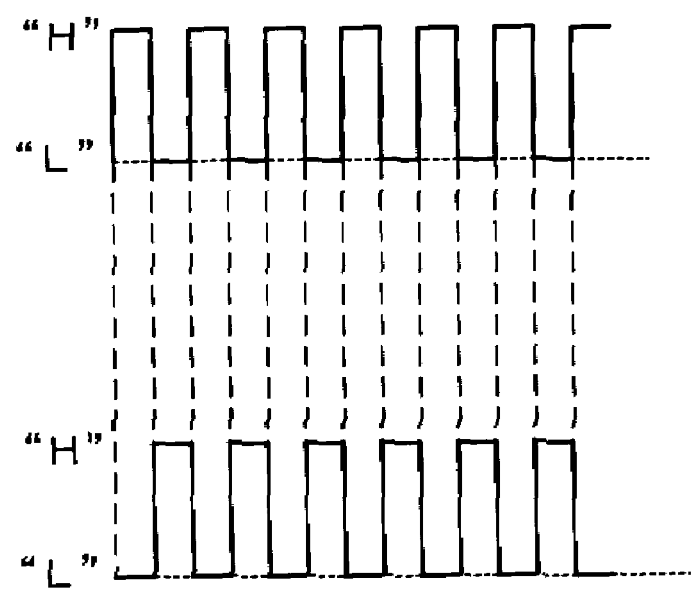
FIG. 2 is a time chart of a control signal that controls the ON/OFF of a switch.

The control section 39 is one that controls the ON/OFF of the switches 31 to 36. Namely, the control section 39 supplies a control signal S1 to the switches 31, 33, and 35. The control section 39 supplies a control signal S2 to the switches 32, 34, and 36. In the control signals S1 and S2, their signal levels change to a high level (hereinafter referred to as "H") and a low-level (hereinafter referred to as "L") alternately as illustrated in FIG. 2.

The switches 31 to 36 turn on, respectively when the control signal whose signal level is H level is supplied thereto. Namely, the switches 31 to 36 turn on. Moreover, the switches 31 to 36 open, respectively when the control signal whose signal is L level is supplied thereto. Namely, the switches 31 to 36 turn off.

The control section 39 is structured to include, for example, a pulse generation circuit and a flip-flop circuit. It is noted that the control section 39 can be structured by a micro computer including a CPU (Central Processing Unit), a ROM (Read Only Memory), a RAM (Random Access Memory), and the like.

An explanation will be next given of an operation of the voltage balance circuit 30 of FIG. 1.

The control section 39 supplies the control signal as in FIG. 2 to the switches 31 to 36.

As illustrated in FIG. 2, the signal level of the control signal S1 and the signal level of the control signal S2 change to H level and L level alternately.

The switches 31, 33, 35 and the switches 32, 34, 36 turn on/off alternately according to the supplied control signals S1 and S2.

When the control signal S1 becomes "H", the switches 31, 33, and 35 turn on. The connecting node N1 is connected to the positive polarity of the secondary battery B1 via the switch 31. The connecting node N2 is connected to the negative polarity of the secondary battery B1 and the positive polarity of the secondary battery B2 via the switch 33. Then, the connecting node N3 is connected to the negative polarity of the secondary battery B2 via the switch 35. Thereby, the capacitor 37 is connected between the positive polarity and the negative polarity of the secondary battery B1. Moreover, the capacitor 38 is connected between the positive polarity and the negative polarity of the secondary battery B2. In other words, the secondary battery B1 and the capacitor 37 are connected in parallel to each other. Also, the secondary battery B2 and the capacitor 38 are connected in parallel to each other When the secondary battery B1 and the capacity 37 are connected in parallel to each other, discharging is performed between the secondary battery B1 and the capacitor 37 according to the voltage between both polarities of the secondary battery B1 and the voltage between both ends of the capacitor 37. In other words, when the voltage between both polarities of the secondary battery B1 is higher than the voltage between both ends of the capacitor 37, the secondary battery B1 charges the capacitor 37 via the switches 31 and 33. At the time of charging, storage energy of the secondary battery B1 moves to the capacitor 37. When the secondary battery B1 charges the capacitor 37, the voltage between both ends of the secondary battery B1 reduces. Then, the voltage between both polarities of the secondary battery B1 and the voltage between both ends of the capacitor 37 are substantially equal to each other. On the other hand, when the voltage between both polarities of the secondary battery B1 is less than the voltage between both ends of the capacitor 37, the secondary battery B1 is charged by the capacitor 37 via the switches 31 and 33. At the time of charging, storage energy of the capacitor 37 moves to the secondary battery B1. When the secondary battery B1 is charged, the voltage between both ends of the secondary battery B1 rises. Then, the voltage between both polarities of the secondary battery B1 and the voltage between both ends of the capacitor 37 are substantially equal to each other.

Moreover, when the voltage between both polarities of the secondary battery B1 and the voltage between both ends of the capacitor 37 are equal to each other, no current flows into the secondary battery B1 or the capacitor 37 even if the switches 31 and 33 turn on.

When the secondary battery B2 and the capacitor 38 are arranged in parallel, charging is performed between the secondary battery B2 and the capacitor 38 in the same manner according to the voltage between both polarities of the secondary battery B2 and the voltage between both ends of the capacitor 38. Then, the voltage between both polarities of the secondary battery B2 and the voltage between both ends of the capacitor 38 rises and lowers. Thereby, the voltage between both polarities of the secondary battery B2 and the voltage between both ends of the capacitor 38 become substantially equal to each other.

In addition, internal resistance (impedance) and the like of the capacitor 37 are extremely small as compared with conventional balance resistance. Accordingly, energy loss caused by discharging becomes extremely small as compared with the conventional case.

Sequentially, the control signal S1 becomes "L." Also, the control signal S2 becomes "H."

The switches 31, 33, and 35 turn off according to the signal level of the control signal S1. Moreover, the switches 32, 34, and 36 turn on according to the signal level of the control signal S2. When the switches 31 to 36 turn on/off in this way, the connecting node N1 is connected to the positive polarity of the secondary battery B2 via the switch 32. The connecting node N2 is connected to the negative polarity of the secondary battery B2 and the positive polarity of the secondary battery B3 via the switch 34. Then, the connecting node N3 is connected to the negative polarity of the secondary battery B3 via the switch 36. The capacitor 37 is thereby connected between the positive polarity and the negative polarity of the secondary battery B2. Moreover, the capacitor 38 is connected between the positive polarity and the negative polarity of the secondary battery B3. Namely, the capacitor 37 is connected to the secondary battery B2 in parallel. Moreover, the capacitor 38 is connected to the secondary battery B3 in parallel.

When the capacitor 38 is connected to the secondary battery B3 in parallel, discharging is performed between the secondary battery B3 and the capacitor 38 according to the voltage between both polarities of the secondary battery B3 and the voltage between both ends of the capacitor 38.

The control section 39 repeats such ON/OFF control of the switches 31 to 36 to balance voltages among the secondary batteries B1, B2, and B3.

For example, in the case where the voltage between both polarities of the secondary battery B1 is higher than the voltage between both polarities of each of the secondary batteries B2 and B3, the secondary battery B1 charges the capacity 37 when the switches 31, 33, and 35 turn on and the switches 32, 34, and 36 turn off. For this reason, the voltage between both polarities of the secondary battery B1 reduces. Moreover, the voltage between both ends of the capacitor 37 increases.

Next, when the switches 31, 33, and 35 turn off and the switches 32, 34, and 36 turn on, the capacitor 37 charges the secondary battery B2, so that the voltage between both polarities of the secondary battery B2 increases. This reduces a difference between the voltage between both polarities of the secondary battery B1 and the voltage between both polarities of the secondary battery B2.

Next, when the switches 31, 33, and 35 turn on and the switches 32, 34, and 36 turn off, the secondary battery B2 charges the capacitor 38. For this reason, the voltage between both ends of the capacitor 38 increases.

Next, when the switches 31, 33, and 35 turn off and the switches 32, 34, and 36 turn on, the capacitor 38 charges the secondary battery B3, so that the voltage between both polarities of the secondary battery B3 increases. This reduces a difference between the voltage between both polarities of the secondary battery B2 and the voltage between both polarities of the secondary battery B3.

In this way, when ON/OFF operations of the switches 31, 33, 35 and the switches 32, 34, 36 are repeated, so that storage energy moves to the secondary batteries B2 and B3 with low voltage from the secondary battery B1 with high voltage via the capacitors 37 and 38. Then, voltages between polarities of the respective secondary batteries B1, B2, and B3 are balanced.

As mentioned above, in the voltage balance circuit 30 of this embodiment, the capacitors 37, 38 and the secondary batteries B1 and B2 are connected in parallel and charging and discharging are performed therebetween. Thereafter, the capacitors 37, 38 and the secondary batteries B2 and B3 are connected in parallel and charging and discharging are performed therebetween. Accordingly, the voltages of the secondary batteries B1 to B3 can be balanced without loss.

Second Embodiment

Figure 3:
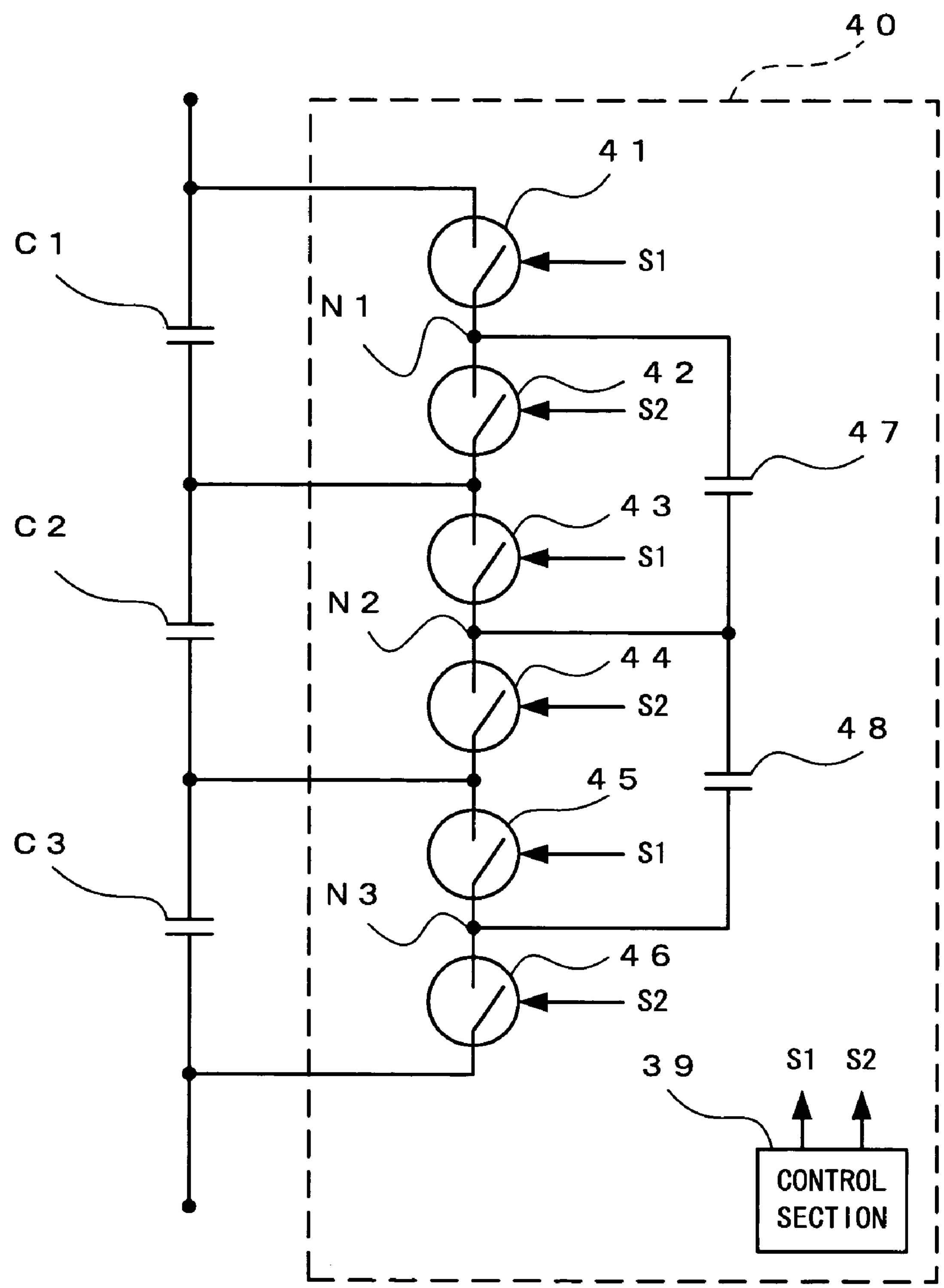
FIG. 3 is a structural view illustrating a voltage balance circuit according to a second embodiment of the present invention.

FIG. 3 is a structural view illustrating a voltage balance circuit according to a second embodiment of the present invention.

A voltage balance circuit 40 of the second embedment is a circuit that balances voltages between both ends of the respective capacitors C1, C2, and C3 where a storage circuit includes capacitors C1, C2, and C3 connected to one another in series.

The basic structure of the voltage balance circuit 40 is the same as that of FIG. 1, and includes six switches 41, 42, 43, 44, 45, and 46, two capacitors 47, and 48, and a control section 39 for controlling the switches 41 to 46 to be turned on and off.

One end of the switch 41 is connected to one electrode of the capacitor C1. The other end of the switch 41 is connected to one end of the switch 42 by the connecting node N1. The other end of the switch 42 is connected to the other electrode of the capacitor C1. One end of the switch 43 is connected to one electrode of the capacitor C2. The other end of the switch 43 is connected to one end of the switch 44 by the connecting node N2. The other end of the switch 44 is connected to the other electrode of the capacitor C2. One end of the switch 45 is connected to one electrode of the capacitor C3. The other end of the switch 45 is connected to one end of the switch 46 by the connecting node N3. The other end of the switch 46 is connected to the other electrode of the capacitor C3.

The capacitor 47 is connected between the connecting node N1 and the connecting node N2. The capacitor 48 is connected between the connecting node N2 and the connecting node N3.

An explanation will be next given of an operation of the voltage balance circuit 40 of FIG. 3.

The control section 39 supplies the control signal S1 to the switches 41, 43, and 45 similar to the first embodiment. The control section 39 supplies the control signal S2 to the switches 42, 44, and 46.

When the switches 41, 43, and 45 are turned on by the control signal S1 and the switches 42, 44, and 46 are turned off by the control signal S2, the connecting node N1 is connected to one electrode of the capacitor C1 via the switch 42. The connecting node N2 is connected to the other electrode of the capacitor C1 and one electrode of the capacitor C2 via the switch 43. Then, the connecting node N3 is connected to the other electrode of the capacitor C2 via the switch 45. Thereby, the capacitor 47 is connected to the capacitor C1 in parallel to each other. The capacitor 48 is connected to the capacitor C2 in parallel to each other.

The capacitor C1 and the capacitor 47 are connected in parallel to each other, and charging and discharging are performed therebetween. When charging and discharging are performed, the voltage between both ends of the capacitor C1 and the voltage between both ends of the capacitor 47 become substantially equal to each other. The capacitor C2 and the capacitor 48 are connected in parallel to each other, and charging and discharging are performed therebetween. The voltage between both ends of the capacitor C2 and the voltage between both ends of the capacitor 48 become substantially equal to each other.

When the switches 41, 43, and 45 are turned off by the control signal S1 and the switches 42, 44, and 46 are turned on by the control signal S2, the connecting node N1 is connected to one electrode of the capacitor C2 via the switch 43. The connecting node N2 is connected to the other electrode of the capacitor C2 and one electrode of the capacitor C3 via the switch 44. Then, the connecting node N3 is connected to the other electrode of the capacitor C3 via the switch 46. Namely, connects the capacitor 47 is thereby connected to the capacitor C2 in parallel to each other. The capacitor 48 is connected to the capacitor C3 in parallel to each other.

When the capacitor C2 and the capacitor 47 are connected in parallel to each other, charging and discharging are performed therebetween. When the capacitor C3 and the capacitor 48 are connected in parallel to each other, charging and discharging are performed therebetween.

For example, when the voltage between both ends of the capacitor C2 is lower than the voltage between both ends of the capacitor 47, energy of the capacitor 47 moves to the capacitor C2. The voltage between both ends of the capacitor C2 rises. This balances the voltage between both ends of the capacitor C1 and the voltage between both ends of the capacitor C2 to each other. In addition, when the voltage between both ends of the capacitor 47 is equal to the voltage between both ends of the capacitor C2, movement of energy does not occur. Furthermore, when the voltage between both ends of the capacitor C2 is higher than the voltage between both ends of the capacitor 47, energy moves to the capacitor 47 from the capacitor C2. Thereby, the voltage between both ends of the capacitor 47 and the voltage between both ends of the capacitor C2 are substantially equal to each other.

Accordingly, the control section 39 repeats ON/OFF control of the switches 41 to 46 to substantially balance the voltages between both ends of the respective capacitors C1 and C2.

Similarly, regarding the voltages between both ends of the respective capacitor C2 and capacitor C3, the control section 39 repeats ON/OFF control of the switches 41 to 46 to substantially balance the voltages between both ends of the respective capacitors C2 and C3. Namely, the voltages between both ends of the respective capacitors C1 to C3 are balanced.

As mentioned above, in the voltage balance circuit 40 of this embodiment, even when the storage circuit includes the capacitors C1, C2, C3, it is possible to balance the voltages between both ends of the respective capacitors C1 to C3 without loss.

Third Embodiment

Figure 4:
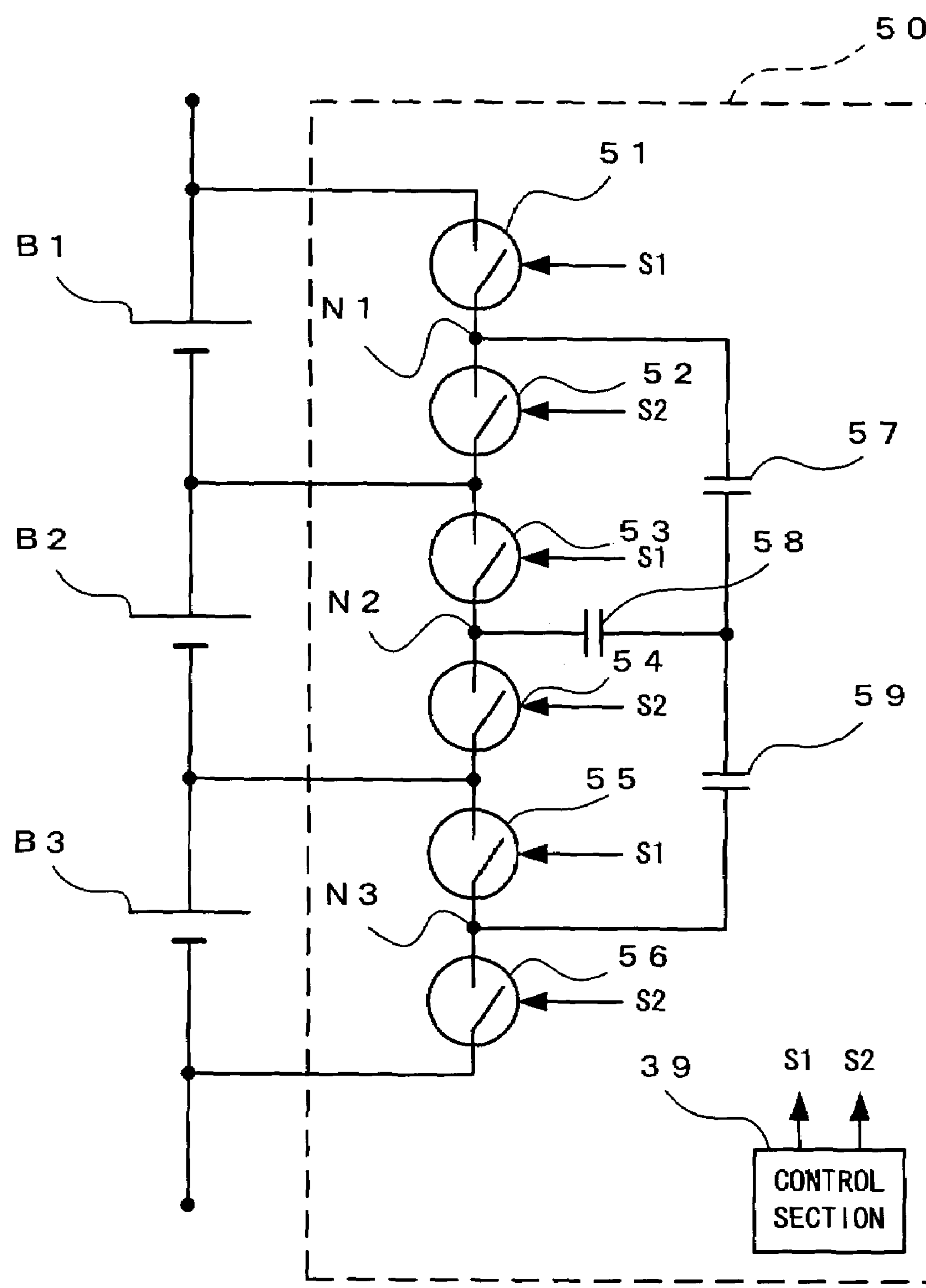
FIG. 4 is a view illustrating a structure of a voltage balance circuit according to a third embodiment of the present invention.

FIG. 4 is a view illustrating a structure of a voltage balance circuit according to a third embodiment of the present invention.

A voltage balance circuit 50 of this embodiment connects multiple capacitors to the respective secondary batteries B1 to B3.

The voltage balance circuit 50 includes six switches 51, 52, 53, 54, 55, and 56, which are similar to the switches 31 to 36 of the first embodiment, capacitors 57, 58, and 59 and a control section 39. Namely, the capacitor 58 is added to the voltage balance circuit 50.

One end of the switch 51 is connected to the positive polarity of the secondary battery B1. The other end of the switch 51 is connected to one end of the switch 52 by the connecting node N1. The other end of the switch 52 is connected to the negative polarity of the secondary battery B1. One end of the switch 53 is connected to the positive polarity of the secondary battery B2. The other end of the switch 53 is connected to one end of the switch 54 by the connecting node N2. The other end of the switch 54 is connected to the negative polarity of the secondary battery B2. One end of the switch 55 is connected to the positive polarity of the secondary battery B3. The other end of the switch 55 is connected to one end of the switch 56 by the connecting node N3. The other end of the switch 56 is connected to the negative polarity of the secondary battery B3.

One electrode of the capacitor 57 is connected to the connecting node N1. One electrode of the capacitor 58 is connected to the connecting node N2. One electrode of the capacitor 59 is connected to the connecting node N3. The electrodes of the respective capacitors 57, 58, and 59 are connected in common.

An operation of the voltage balance circuit 50 will be next explained.

The control section 39 supplies the control signals S1 and S2, which are the same as those of the first embodiment, to the switches S1 to 56. The switches S1, 53, 55 and the switches 52, 54, and 56 turn on/off, alternately.

When the switches S1, 53, 55 turn on, the connecting node N1 is connected to the positive polarity of the secondary battery B1 via the switch S1. The connecting node N2 is connected to the negative polarity of the secondary battery B1 and the positive polarity of the secondary battery B2 via the switch 53. Then, the connecting node N3 is connected to the negative polarity of the secondary battery B2 via the switch 55. Thereby, the capacitors 57 and 58 are connected in series between the positive polarity and negative polarity of the secondary battery B1. The capacitors 58 and 59 are connected in series between the positive polarity and negative polarity of the secondary battery B2. Namely, the series circuits of the capacitors 57 and 58 are connected to the secondary battery B in parallel. The series circuits of the capacitors 58 and 59 are connected to the secondary battery B2 in parallel. Thereby, the voltages applied to both ends of the respective capacitors 57, 58 and 59 become ½ as compared with the case in which no capacitor 58 is provided. In other words, one having ½ resisting pressure as compared with the case in which no capacitor 58 is provided can be used as capacitors 57 to 59.

The secondary battery B1 and the capacitors 57 and 58 perform charging and discharging therebetween. By charging and discharging, the voltage between the secondary battery B1 and the capacitors 57 and 58 reaches the voltage of the secondary battery B1 or voltage close thereto. The secondary battery B2 and the capacitors 58 and 59 perform charging and discharging therebetween. By charging and discharging, the voltage between the secondary battery B2 and the capacitors 58 and 59 reaches the voltage of the secondary battery B2 or voltage close thereto.

Sequentially, when the switches 51, 53, and 55 are turned off by the control signal S1 supplied by the control section 39 and the switches 52, 54, and 56 are turned on by the control signal S2, the connecting node N1 is connected to the positive polarity of the secondary battery B2 via the switch 52. The connecting node N2 is connected to the negative polarity of the secondary battery B2 and the positive polarity of the secondary battery B3 via the switch 54. Then, the connecting node N3 is connected to the negative polarity of the secondary battery B3 via the switch 56. Thereby, the series circuits of the capacitors 57 and 58 are connected between the positive polarity and negative polarity of the secondary battery B2. The series circuits of the capacitors 58 and 59 are connected between the positive polarity and negative polarity of the secondary battery B3. Namely, the series circuits of the capacitors 57 and 58 are connected to the secondary battery B2 in parallel. The series circuits of the capacitors 58 and 59 are connected to the secondary battery B3 in parallel.

Regarding the secondary battery B2 and the capacitors 57 and 58, charging and discharging are performed therebetween. Regarding the secondary battery B3 and the capacitors 58 and 59, charging and discharging are performed therebetween.

For example, when the voltage between both polarities of the secondary battery B1 is higher the voltage between both polarities of each of the secondary batteries B2 and B3, the series circuits of the capacitors 57 and 58 are charged by the secondary battery B1. Next, energy is supplied to the secondary battery B2 from the series circuits of the capacitors 57 and 58. Accordingly, the voltages between both polarities of the respective secondary battery B1 and secondary battery B2 are balanced. When the voltages between both polarities of the respective secondary battery B2 and secondary battery B3 are different from each other, the voltages between both polarities of the respective secondary battery B2 and secondary battery B3 are balanced by the series circuits of the capacitors 58 and 59, similarly.

In this way, the switches 51, 53, 55 and the switches 52, 54, and 56 turn on/off, alternately to eliminate variations in voltages of the secondary batteries B1 to B3.

As mentioned above, according to the voltage balance circuit 50 of this embodiment, the series circuits of the capacitors 57 and 58 are connected to the secondary battery B1 in parallel and the series circuits of the capacitors 58 and 59 are connected to the secondary battery B2 in parallel to charge and discharge the respective capacitors 57 to 59. Thereafter, the series circuits of the capacitors 57 and 58 are connected to the secondary battery B2 in parallel and the series circuits of the capacitors 58 and 59 are connected to the secondary battery B3 in parallel to charge and discharge the respective capacitors 57 to 59. For this reason, similar to the first embodiment, the voltages of the secondary batteries B1 to B3 can be balanced without loss.

Moreover, in the voltage balance circuit 50, the capacitor 58 is connected to the connecting node N2 and the connecting node between the capacitor 57 and the capacitor 59, so that the series circuits of the capacitors 58 to 59 are formed according to the ON/OFF of the switches 51 to 56. For this reason, one having lower resisting pressure can be used as capacitors 57 to 59.

Fourth Embodiment

Figure 5:
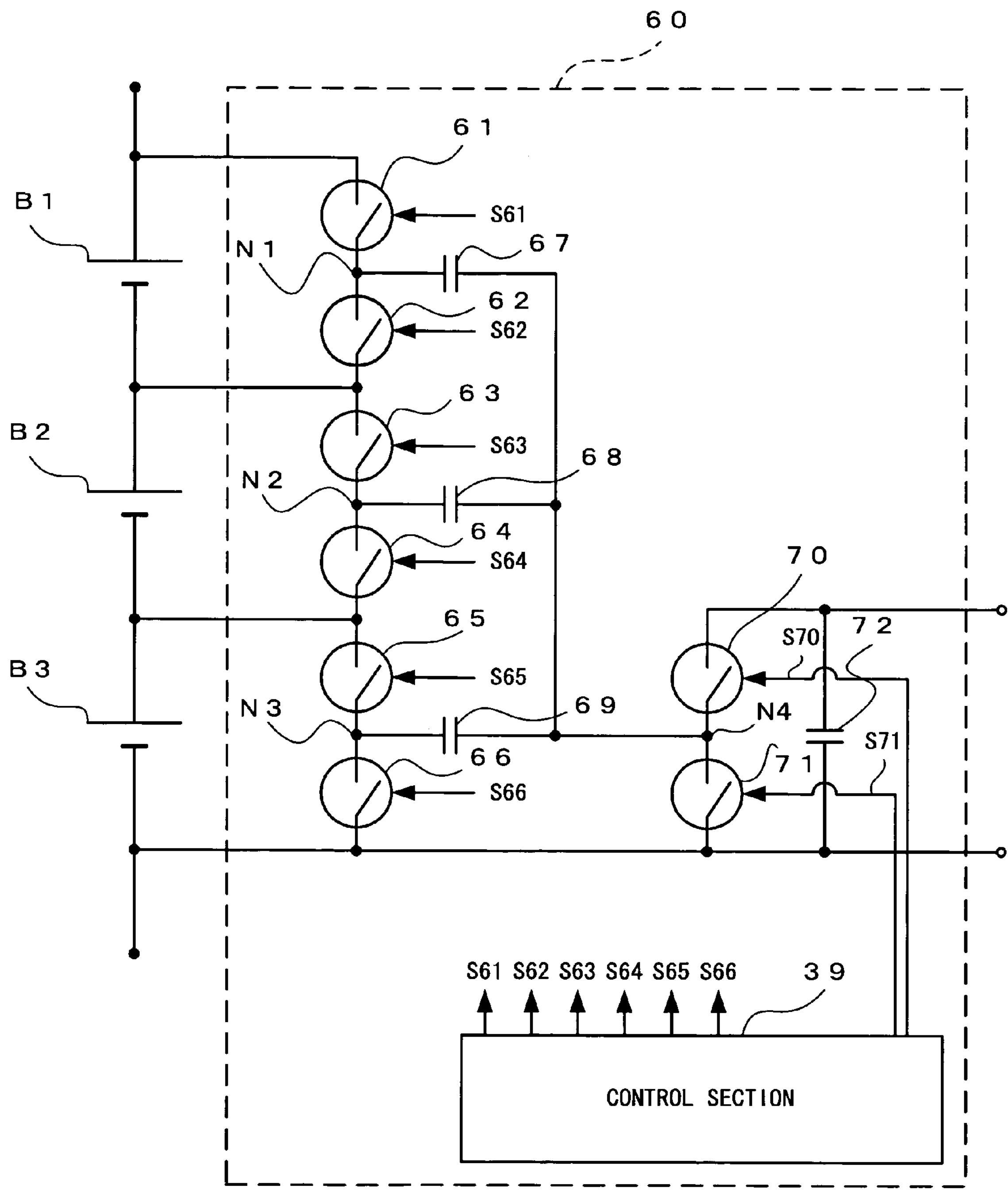
FIG. 5 is a view illustrating a structure of a voltage detection circuit according to a fourth embodiment of the present invention.

FIG. 5 is a view illustrating a structure of a voltage balance circuit according to a fourth embodiment of the present invention.

A voltage balance circuit 60 of this embodiment is a circuit that detects voltage between both polarities of each of the secondary batteries B1, B2, and B3 connected in series using the voltage balance circuit 50 according to the third embodiment.

The voltage balance circuit 60 includes six switches 61, 62, 63, 64, 65, and 66, capacitors 67, 68, and 69 and a control section 39.

One end of the switch 61 is connected to the positive polarity of the secondary battery B1. The other end of the switch 61 is connected to one end of the switch 62 by the connecting node N1. The other end of the switch 62 is connected to the negative polarity of the secondary battery B1. One end of the switch 63 is connected to the positive polarity of the secondary battery B2. The other end of the switch 63 is connected to one end of the switch 64 by the connecting node N2. The other end of the switch 64 is connected to the negative polarity of the secondary battery B2. One end of the switch 65 is connected to the positive polarity of the secondary battery B3. The other end of the switch 65 is connected to one end of the switch 66 by the connecting node N3. The other end of the switch 66 is connected to the negative polarity of the secondary battery B3.

The voltage detection circuit 60 further includes a voltage application switch 70, a charging switch 71, and a capacitor 72. The capacitor 72 is a capacitor that holds voltages between both polarities of the respective secondary batteries B1, B2, and B3. The voltage application switch 70 is used to apply voltage. The charging switch 71 is used to perform charging. The control section 39 supplies control signals S61, S62, S63, S64, S65 and S66 to the switches 61, 62, 63, 64, 65, and 66, respectively. Moreover, the control section 39 supplies control signals S71 and S70 to the charging switch 71 and the voltage application switch 70, respectively.

One end of the voltage application switch 70 is connected to one end of the capacitor 72. One end of the charging switch 71 is connected to the other end of the voltage application switch 70. The other end of the capacitor 72 is connected to the negative polarity of the secondary battery B3. The other end of the charging switch 71 is connected to the other end of the capacitor 72. The connecting node N4 is a connecting node between the other end of the voltage application switch 70 and one end of the charging switch 71. The other ends of the respective capacitors 67 to 69 are connected to the connecting node N4 in common.

An operation of the voltage balance circuit 60 will be next explained.

Figure 6:
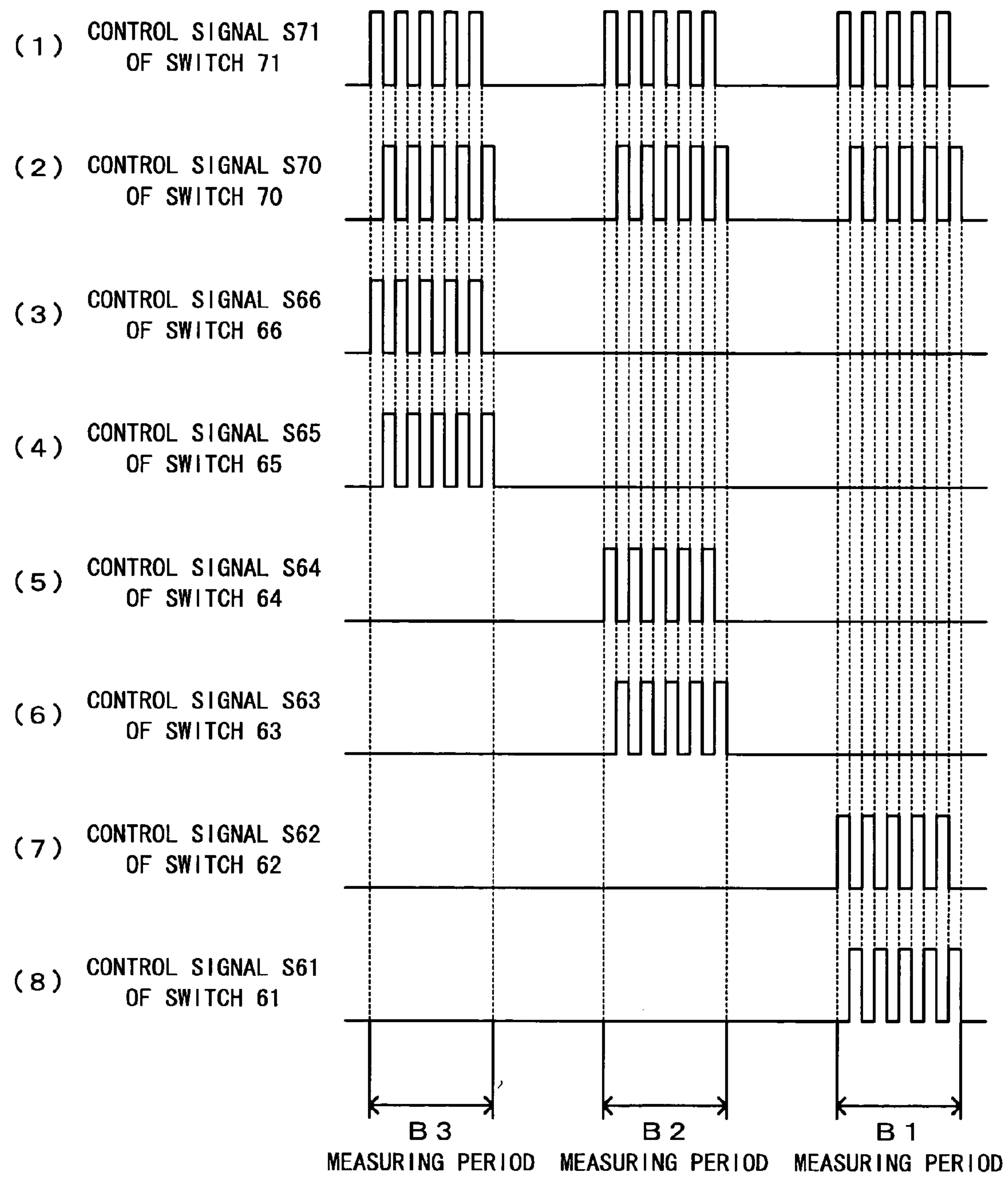
FIG. 6 is time charts of control signals that control the ON/OFF of a voltage applying switch and a charging switch.

Time charts of the control signals S61 to S66, S70, and S71 that control ON/OFF of the switches 61 to 66, the voltage application switch 70 and the charging switch 71 are illustrated in FIGS. 6(1) to (8).

When the voltage between the polarities of the secondary battery B3 is detected, the control section 39 supplies the control signals S71, S70, S66, and S65 to the charging switch 71 and the switch 66 and the voltage application switch 70 and the switch 65 as illustrated in FIGS. 6(1) to (4).

As illustrated in FIGS. 6(1) and (3), the control signals S71 and S66 become "H" and "L" during a secondary battery B3 measuring period at the same timing. Moreover, as illustrated in FIGS. 6(2) and (4), the control signals S70 and S65 become "L" and "H" at the same timing.

When the control signals S71 and S66 become "H", the charging switch 71 and the switch 66 turn on. The charging switch 71 and the switch 66 turn on, so that both ends of the capacitor 69 are connected to the negative polarity of the secondary battery B3 via the switch 66. Thereby, voltage Vc between both polarities of the capacitor 69 becomes zero. Sequentially, the charging switch 71 and the switch 66 turn off and the voltage application switch 70 and the switch 65 turn on according to the control signals S70, S71, S66, and S65. Thereby, one electrode of the capacitor 69 is connected to the positive polarity of the secondary battery B3 via the switch 65. The other electrode of the capacitor 69 is connected to one electrode of the capacitor 72 via the voltage application switch 70. Accordingly, a difference in voltage between voltage VB3 with the positive polarity of the secondary battery B3 and voltage Vc between both polarities of the capacitor 69 is applied to one electrode of the capacitor 72. Here, since the voltage Vc between both polarities of the capacity 69 is zero, voltage between both polarities of the secondary battery B3 is applied to the capacitor 72. The capacitor 72 is charged based on the applied voltage VB3. Next, the switches 65 and 70 turn off and the switches 66 and 71 turn on again. At this time, when charging to the capacitor 72 is insufficient, the voltage between both polarities of the capacitor 72 does not reach the voltage between both polarities of the secondary battery B3.

The control section 39 controls ON/OFF of the charging switch 71 and the switch 66 and the voltage application switch 70 and the switch 65 repeatedly, so that the voltage between both polarities of the capacity 72 rises. Then, the voltage between both polarities of the secondary battery B3 and the voltage between both polarities of the capacity 72 becomes equal to each other. The voltage between both polarities of the capacitor 72 is measured under this state, thereby making it possible to measure the voltage between both polarities of the secondary battery B3.

When the voltage between both polarities of the secondary battery B2 is detected, the control section 39 supplies the control signals S71 and S64 to the charging switch 71 and the switch 64, respectively, during the period when the voltage between both polarities of the secondary battery B2 is measured as illustrated in FIGS. 6(1) and (5). The control signals S71 and S64 become "H" and "L" at the same time.

Moreover, the control section 39 supplies the control signals S70 and S63 to the voltage application switch 70 and the switch 63, respectively, during the period when the voltage between both polarities of the secondary battery B2 is measured as illustrated in FIGS. 6(2) and (6). The control signals S70 and S63 become "L" and "H" at the same time.

The charging switch 71 and the switch 64 are turned on by the control signals S71 and S64, so that both ends of the capacitor 68 are connected between the positive polarity of the secondary battery B3 and the negative polarity of the secondary battery B3 via the switches 64 and 71. Sequentially, when the charging switch 71 and the switch 64 turn off and the voltage application switch 70 and the switch 63 turn on, one electrode of the capacitor 68 is connected to the positive polarity of the secondary battery B2 via the switch 63. The other electrode of the capacitor 68 is connected to one electrode of the capacitor 72 via the voltage application switch 70. Accordingly, a difference in voltage between voltage VB2 with the positive polarity of the secondary battery B2 and voltage Vc between both polarities of the capacitor 68 is applied to one electrode of the capacitor 72.

Since the voltage Vc between both polarities of the capacity 68 immediately before being connected to the capacitor 72 is voltage VB3 with the positive polarity of the secondary battery B3, the voltage between both polarities of the secondary battery B2 is applied to the capacitor 72.

Then, the control section 39 controls ON/OFF of the charging switch 71 and the switch 64 and the voltage application switch 70 and the switch 63 repeatedly, so that the voltage between both polarities of the secondary battery B2 and the voltage between both polarities of the capacity 72 becomes equal to each other. The voltage between both polarities of the capacitor 72 is measured under this state, thereby making it possible to measure the voltage between both polarities of the secondary battery B2.

The same can be applied to the case where the voltage between both polarities of the secondary battery B1 is detected, and the control section 39 turn on/off the charging switch 71 and the switch 62 and the voltage application switch 70 and the switch 61, alternately.

The charging switch 71 and the switch 62 are turned on by the control signals S71 and S62, so that both ends of the capacitor 67 are connected between the positive polarity of the secondary battery B2 and the negative polarity of the secondary battery B3.

Sequentially, when the charging switch 71 and the switch 62 turn off and the voltage application switch 70 and the switch 61 turn on, one electrode of the capacitor 67 is connected to the positive polarity of the secondary battery B1 via the switch 61. The other electrode of the capacitor 67 is connected to one electrode of the capacitor 72 via the switch 71. Accordingly, a difference in voltage between voltage VB1 with the positive polarity of the secondary battery B1 and voltage Vc between both polarities of the capacitor 67 is applied to one electrode of the capacitor 72. Since the voltage Vc between both polarities of the capacity 67 immediately before being connected to the capacitor 72 is voltage VB2 with the positive polarity of the secondary battery B2, the voltage between both polarities of the secondary battery B1 is applied to the capacitor 72.

Then, the control section 39 controls ON/OFF of the charging switch 71 and the switch 62 and the voltage application switch 70 and the switch 61 repeatedly, so that the voltage between both polarities of the secondary battery B1 and the voltage between both polarities of the capacity 72 becomes equal to each other. The voltage between both polarities of the capacitor 72 is measured under this state, thereby making it possible to measure the voltage between both polarities of the secondary battery B1.

As mentioned above, in the voltage detection circuit 60 of this embodiment, the voltages between both polarities of the respective secondary batteries B1 to B3 are sequentially applied to the capacitor 72 by switching of the switches 61 to 66, the charging switch 71, and the voltage application switch 70. Accordingly, as compared with the case in which the voltage measuring circuit is provided for each of the secondary batteries B1 to B3, the voltages between both polarities of the respective secondary batteries B1 to B3 can be measured by the simple structure. Moreover, since the position where the voltage between both polarities of each of the secondary batteries B1 to B3 is measured is limited to the both polarities of the capacitor 72, it is possible to measure each voltage with high accuracy without causing variations in the measured value.

Fifth Embodiment

Figure 7:
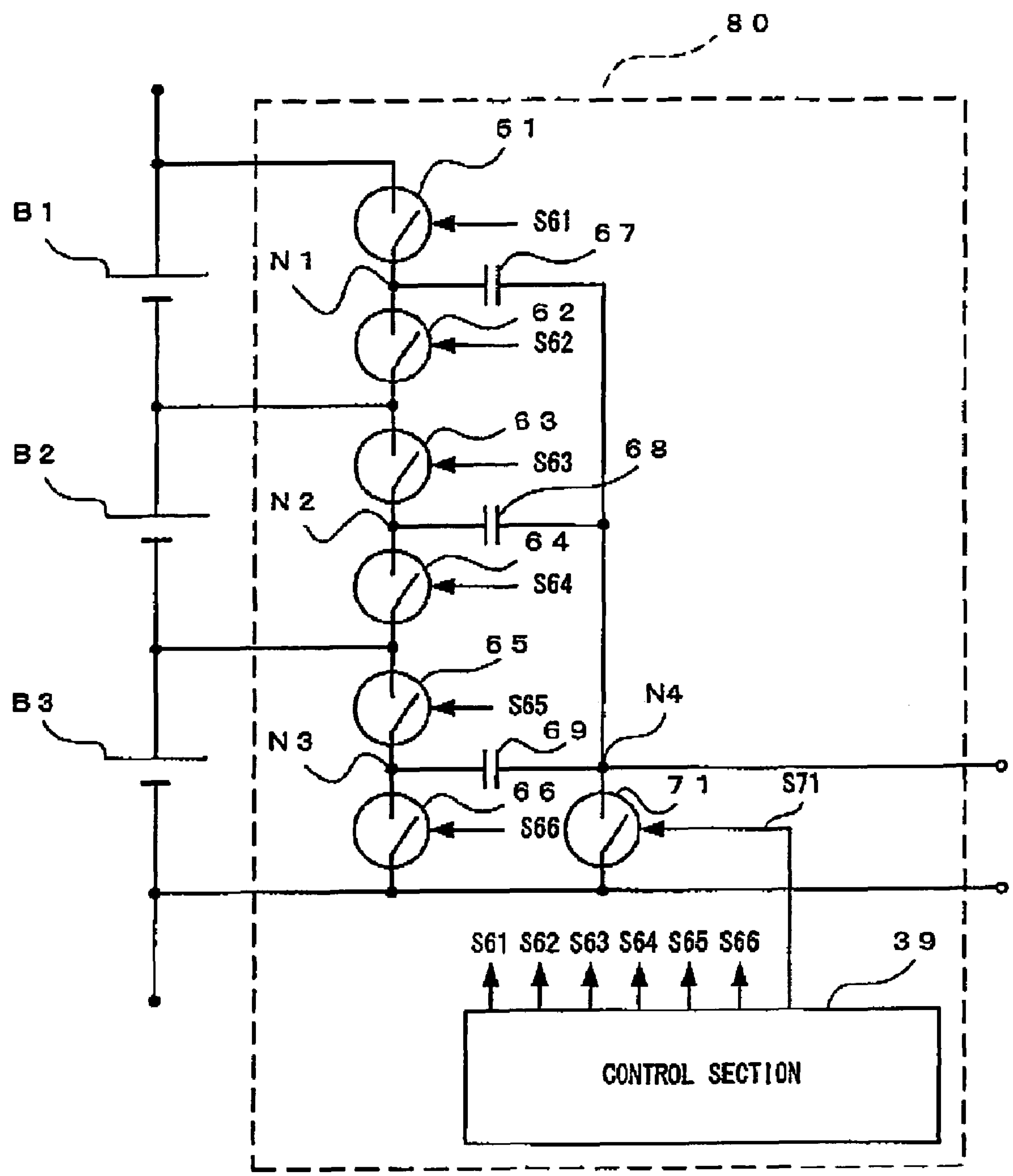
FIG. 7 is a view illustrating a structure of a voltage detection circuit according to a fifth embodiment of the present invention.
Figure 8:
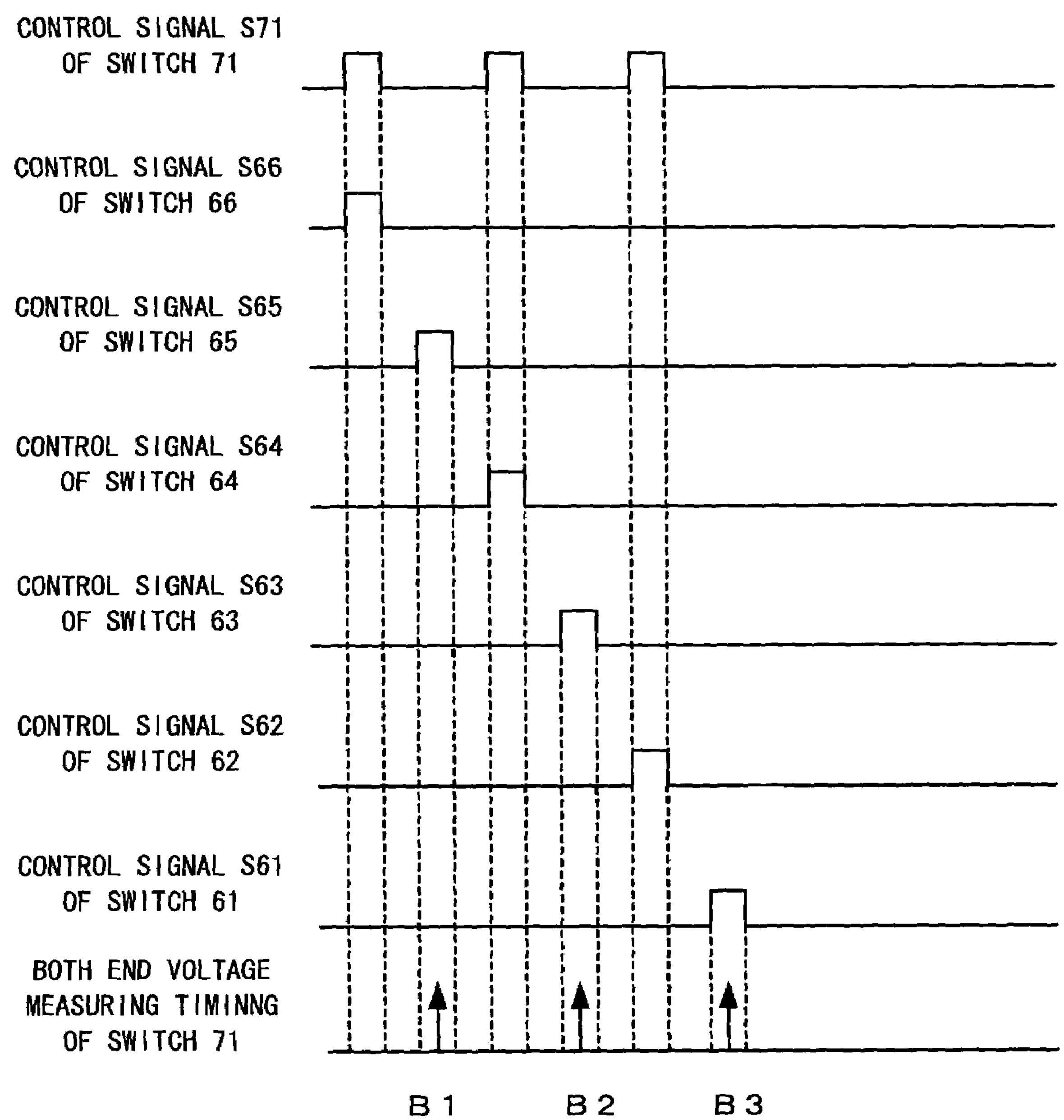
FIG. 8 is a timing chart for scanning of a voltage detection circuit of FIG. 7.
Figure 9:
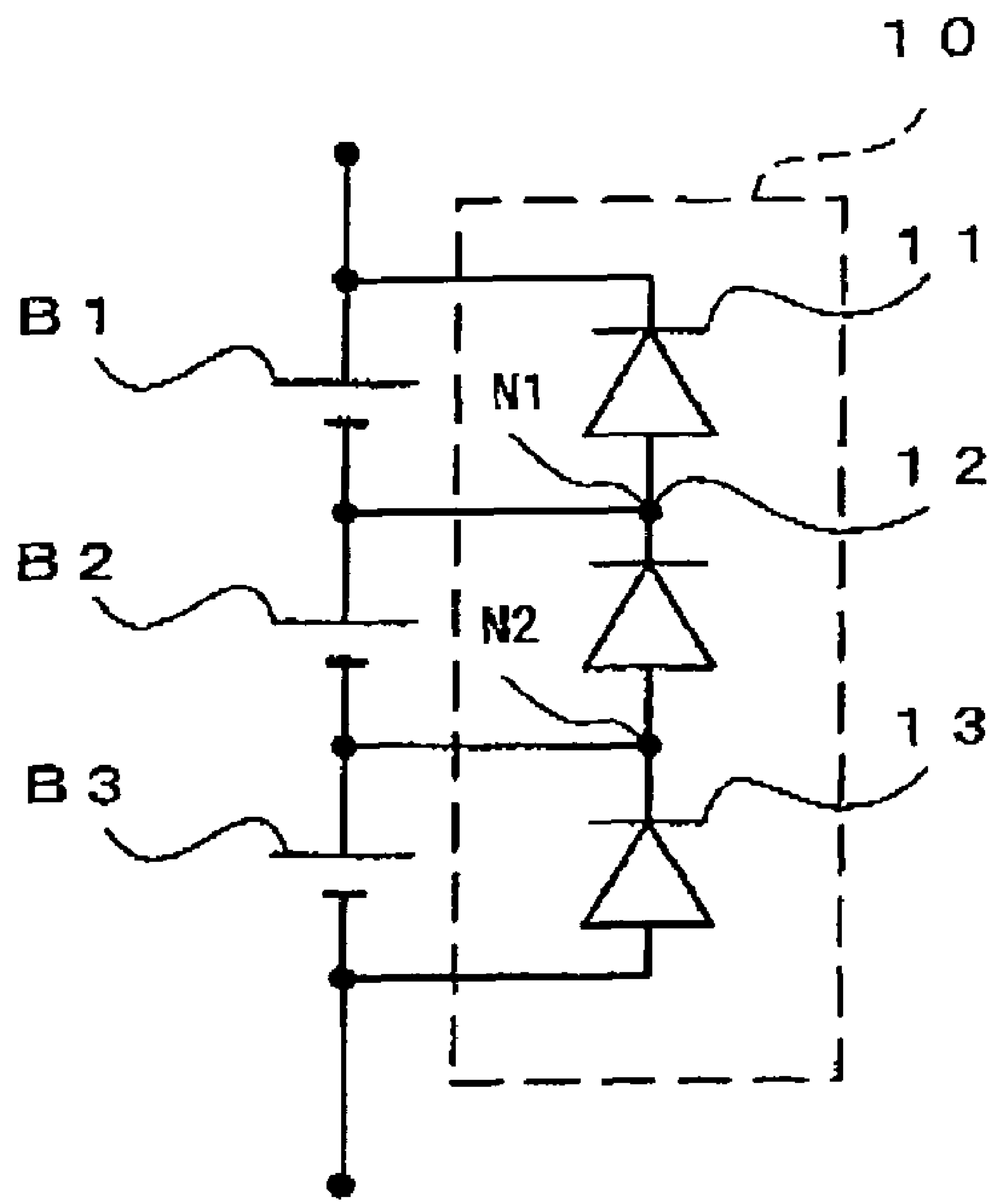
FIG. 9 is a circuit diagram of a voltage balance circuit of a conventional secondary battery.
Figure 10:
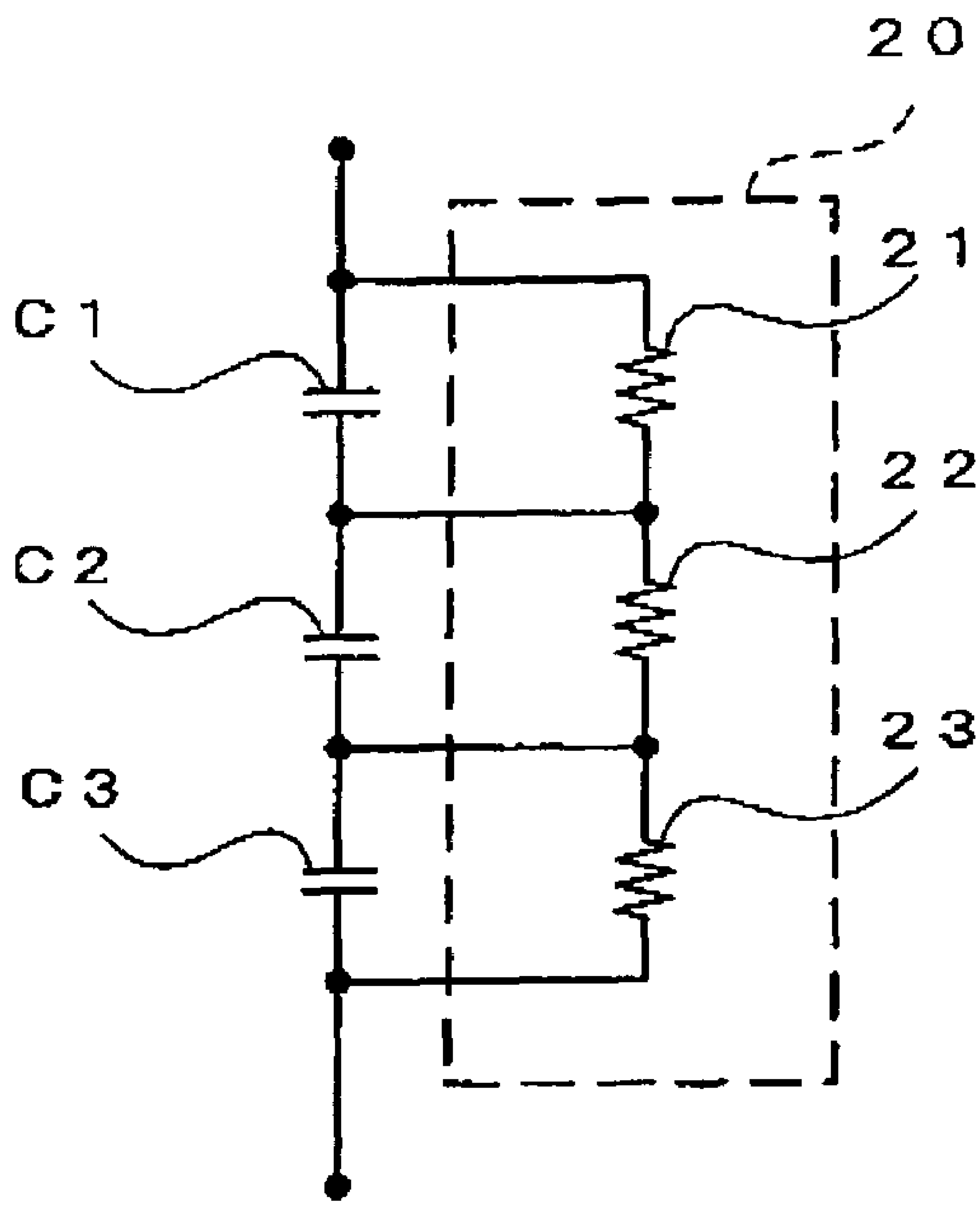
FIG. 10 is a circuit diagram of a voltage balance circuit of a capacitor.

FIG. 7 is a view illustrating a structure of a voltage detection circuit according to a fifth embodiment of the present invention, and FIG. 8 is a timing chart for scanning of a voltage detection circuit of FIG. 7. Common reference numerals are added to components common to the components in FIG. 5.

A voltage detection circuit 80 is a circuit that detects voltage between both polarities of each of the secondary batteries B1, B2 and B3 connected in series, and includes six switches 61 to 66 connected to the secondary batteries B1 to B3 similar to the fourth embodiment, three capacitors 67 to 69 connected to the respective switches 61 to 66 similar to the fourth embodiment, and a charging switch 71.

The switches 62, 64, and 66 are those that detect the negative voltages of the respective secondary batteries B1 to B3. The switches 61, 63, 65, the capacitors 67 to 69, and the charging switch 71 are those that detect the positive voltages of the respective secondary batteries B1 to B3.

In the voltage detection circuit 80, at the time of detecting the voltage between both polarities of the secondary battery B3, the control section 39 supplies control signals S71 and S66 of "H" to the charging switch 71 and the switch 66, respectively as illustrated in FIG. 8. The charging switch 71 and the switch 66 turn on. The charging switch 71 and the switch 66 turn on, so that both ends of the capacitor 69 are connected to the negative polarity of the secondary battery B3 via the switches 66 and 71. The control section 39 turns on the charging switch 71 and the switch 66 until the voltage Vc between both polarities of the capacitor 69 reaches completely zero. Sequentially, when the control signals S71 and S66 become "L", the charging switch 71 and the switch 66 turn off. The control section 39 thereafter sets the signal level of the control signal S65 to "H." The switch 65 turns on. Thereby, one electrode of the capacitor 69 is connected to the positive polarity of the secondary battery B3 via the switch 65. Since the voltage Vc between both polarities of the capacitor 69 is zero, the electric potential of the connecting node N4 becomes the same as the electric potential of the secondary battery B3. At this time, a potential difference between both ends of the charging switch 71 is measured, thereby making it possible to measure the voltage between both polarities of the secondary battery B3.

At the time of detecting the voltage between both polarities of the secondary battery B2, the control section 39 sets the signal level of the control signal S65 to "L." Sequentially, the control section 39 sets the signal levels of the control signals S71 and S64 to "H." The charging switch 71 and the switch 64 turn on. The charging switch 71 and the switch 64 turn on, so that both ends of the capacitor 68 are connected between the positive polarity and the negative polarity of the secondary battery B3 via the switches 64 and 71. The control section 39 turns on the charging switch 71 and the switch 64 until the voltage Vc between both polarities of the capacitor 68 reaches the voltage between both polarities of the secondary battery B3. Sequentially, the control section 39 sets the signal levels of the control signals S71 and S64 to "L." The charging switch 71 and the switch 64 turn off. After that, the control section 39 sets the signal level of the control signal S63 to "H." The switch 63 turns on. Thereby, one electrode of the capacitor 68 is connected to the positive polarity of the secondary battery B2 via the switch 63. At this time, since the voltage Vc between both polarities of the capacitor 68 is voltage VB3 with the positive polarity of the secondary battery B3, voltage between the connecting node N4 and the negative polarity of the secondary battery B3 becomes a differential voltage between an electric potential of the positive polarity of the secondary battery B2 and an electric potential of the positive polarity of the secondary battery B3. Accordingly, a potential difference between both ends of the charging switch 71 is measured, thereby making it possible to measure the voltage between both polarities of the secondary battery B2.

The same can be applied to the case in which the voltage between both polarities of the secondary battery B1 is detected. First of all, the control section 39 sets the signal level of the control signal S63 to "L." Sequentially, the control section 39 sets the signal levels of the control signals S71 and S62 to "H." The charging switch 71 and the switch 62 turn on. The charging switch 71 and the switch 62 turn on, so that both ends of the capacitor 67 are connected between the positive polarity of the secondary battery B2 and the negative polarity of the secondary battery B3 via the switches 62 and 71. The voltage Vc between both polarities of the capacitor 67 reaches the voltage between the positive polarity of the secondary battery B2 and the negative polarity of the secondary battery B3.

Sequentially, the control section 39 sets the signal levels of the control signals S71 and S62 to "L." The charging switch 71 and the switch 62 turn off. After that, the control section 39 sets the signal level of the control signal S61 to "H." The switch 61 turns on. When the switch 61 turns on, one electrode of the capacitor 67 is connected to the positive polarity of the secondary battery B1 via the switch 61. At this time, since the voltage Vc between both polarities of the capacitor 67 is voltage VB2 with the positive polarity of the secondary battery B2, voltage between the connecting node N4 and the negative polarity of the secondary battery B3 becomes a differential voltage between an electric potential of the positive polarity of the secondary battery B1 and an electric potential of the positive polarity of the secondary battery B2. Accordingly, a potential difference between both ends of the charging switch 71 is measured, thereby making it possible to measure the voltage between both polarities of the secondary battery B1.

As mentioned above, in the voltage detection circuit 80 of this embodiment, since the voltages between both polarities of the respective secondary batteries B1 to B3 can be measured at both ends of the charging switch 71 by switching of the switches 61 to 66 and the charging switch 71, the structure becomes simpler than the voltage detection circuit 60 of the fourth embodiment. Moreover, since the position where the voltage between both polarities is measured is limited to both ends of the charging switch 71, it is possible to measure each voltage with high accuracy without causing variations in the measured value, similar to the fourth embodiment.

In addition, the present invention is not limited to the above-explained embodiments and various modifications may be possible.

For example, in the voltage balance circuit 40 of the second embodiment, the capacitors C1 to C3 were used as storage circuits in place of the secondary batteries B1 to B3. However, in the third to fifth embodiments, the secondary batteries B1 to B3 may be changed to the capacitors C1 to C3. Moreover, each storage circuit may be a circuit including multiple secondary batteries and a circuit having multiple capacitors.

Furthermore, the number of storage circuits such as secondary batteries, capacitors, and the like is not limited to three, and four or more may be possible.

This application is based on the Japanese Patent Application No. 2001-305426 filed on Oct. 1, 2001, entire content of which is expressly incorporated by reference herein.

INDUSTRIAL APPLICABILITY

The present invention can be used in the industrial field to which the storage circuits are used.

The invention claimed is:

1. A voltage balancing circuit that balances voltage between both polarities of each storage circuit of a plurality of storage circuits (B1, B2, B3) connected to one another in series, comprising:

a capacitor (57, 58, 59);

a first connecting section (51, 53, 55) that connects said capacitor in parallel to a first storage circuit selected from said plurality of storage circuits wherein said first storage circuit includes any two of B1, B2, B3 connected to one another in series to charge/discharge said capacitor (57, 58, 59) from said first storage circuit; and a second connecting section (52, 54, 56) that connects said charged/discharged capacitor (57, 58, 59) in parallel to a second storage circuit wherein said second storage circuit includes any two of B1, B2, B3, wherein said any two of B1, B2, B3 of said second storage circuit differs from said any two of B1, B2, B3 of said first storage circuit to charge/discharge said select second storage circuit from said charged/discharged capacitor (57, 58, 59), wherein:

said first connecting section (51, 53, 55) and said second connecting section (52, 54, 56) include a first switch (51, 53, 55) and a second switch (52, 54, 56) that are connected to each other in series between one electrode of said first and second storage circuits and an other electrode; and one end of said capacitor (57, 58, 59) is connected to a connecting node between said first switch (51, 53, 55) and said second switch (52, 54, 56) that are connected to each other in series between the one electrode and the other electrode of said first and second storage circuits, and the other end of said capacitor (57, 58, 59) is connected in common.

2. The voltage balancing circuit according to claim 1, further comprising a control section (39) that repeats processing that connects said selected first storage circuit to said capacitor (57, 58, 59) in parallel and processing that connects said capacitor (57, 58, 59) to said second storage circuit.

3. The voltage balancing circuit according to claim 1, wherein each storage circuit of said plurality of storage circuits connected to one Another in series includes one or multiple secondary batteries (any of B1, B2, B3).

4. The voltage balancing circuit according to claim 1, wherein each storage circuit of said plurality of storage circuits connected to one another in series includes one or multiple secondary capacitors (C1, C2, C3).

5. A voltage balancing method that balances voltage between both polarities of each storage circuit of a plurality of storage circuits (B1, B2, B3) connected to one another in series, comprising the steps of:

controlling a first switch (51, 53, 55) and a second switch (52, 54, 56) connected in series between one electrode and an other electrode of each storage circuit of a plurality of storage circuits (B1, B2, B3) connected to one another in series to balance voltage;

connecting each one end of a plurality of capacitors (57, 58, 59), each having one end connected to a connecting node between the first switch (51, 53, 55) and the second switch (52, 54, 56) and the other end connected in common, to one electrode of each of the plurality of storage circuits (B1, B2, B3) to select series-connected storage circuits (B1 and B2 or B2 and B3) from the polarity of storage circuits (B1, B2, B3) and charge/discharge the plurality of capacitors (57, 58, 59) from the selected storage circuits (B1 and B2 or B2 and B3);

connecting each one end of the plurality of charged/discharged capacitors (57, 58, 59) to the other electrode of each of the plurality of storage circuits (B1, B2, B3) to select another series-connected storage circuits (B2 and B3 or B1 and B2) different from the selected storage circuits (B1 and B2 or B2 and B3) from the plurality of storage circuits (B1, B2, B3) and charge/discharge another selected storage circuits (B2 and B3 or B1 and B2) to/from the plurality of charged/discharged capacitors (57, 58, 59).

* * * * *

UNITED STATES PATENT AND TRADEMARK OFFICE

CERTIFICATE OF CORRECTION

PATENT NO. : 7,288,919 B2
APPLICATION NO. : 10/491362
DATED : October 30, 2007
INVENTOR(S) : Koichi Morita It is certified that error appears in the above-identified patent and that said Letters Patent is hereby corrected as shown below:

Column 18, line 65, please delete the word "select."

Column 19, line 17, please delete the word "selected."

Column 19, line 23, please delete the word "Another" and replace with --another--.

Column 20, line 16, please delete the word "polarity" and replace with --plurality--.

Signed and Sealed this

Sixth Day of May, 2008

JON W. DUDAS
*Director of the United States Patent and Trademark Office*